United States Patent [19]

Ahner et al.

[11] 4,326,130

[45] Apr. 20, 1982

[54] SHIELDING CONTAINER WITH NEUTRON SHIELDING FOR THE TRANSPORTATION AND/OR STORAGE OF SPENT FUEL ELEMENTS

[76] Inventors: Stefan Ahner, In der Gartel 4, 6458 Rodenbach 1; Peter Srostlik, Hainstrasse 56, 6454 Bruchkobel; Helmut Schleich, Auf der Sieb 4, 6456 Langenselbold; Hans Diem, Durerstrasse 13, 8755 Alzenau, all of Fed. Rep. of Germany

[21] Appl. No.: 94,188

[22] Filed: Nov. 14, 1979

[30] Foreign Application Priority Data

Oct. 17, 1978 [DE] Fed. Rep. of Germany ....... 2845129

[51] Int. Cl.[3] ......................... G21C 11/00; G02B 5/00

[52] U.S. Cl. .................................... 250/506; 250/515; 376/272

[58] Field of Search ............... 250/506, 507, 518, 517, 250/515

[56] References Cited

U.S. PATENT DOCUMENTS

| | | | |
|---|---|---|---|
| Re. 29,876 | 1/1979 | Reese | 250/506 |
| 3,727,060 | 4/1973 | Blum | 250/506 |
| 3,930,166 | 12/1975 | Bochard | 250/506 |
| 3,962,587 | 6/1976 | Dufrane et al. | 250/518 |
| 4,153,845 | 5/1979 | Fava | 250/518 |
| 4,218,622 | 8/1980 | McMurty et al. | 250/519 |

FOREIGN PATENT DOCUMENTS

| | | | |
|---|---|---|---|
| 902799 | 8/1962 | United Kingdom | 250/518 |

*Primary Examiner*—Harold A. Dixon

*Attorney, Agent, or Firm*—Cushman, Darby & Cushman

[57] ABSTRACT

There is provided a shielding container for the transportation and/or storage of spent fuel elements having a neutron shield on the outer container surface wherein the neutron shield is made of a series of hollow pieces made of a good heat conducting material and filled with neutron shielding material, the hollow pieces are joined together and provided with heat conducting fins and are fastened to the container surface.

3 Claims, 4 Drawing Figures

SHIELDING CONTAINER WITH NEUTRON SHIELDING FOR THE TRANSPORTATION AND/OR STORAGE OF SPENT FUEL ELEMENTS

BACKGROUND OF THE INVENTION

The invention is directed to a shielding container for the transportation and/or storage of spent fuel elements having a neutron shield on the outer surface of the container.

Containers which are employed for the transportation and/or storage of spent fuel elements must safely seal in the radioactivity of the inserted material and in rigorous tests demonstrate that this is guaranteed even in extreme disaster situations. However, simultaneously they must also shield off the gamma and neutron rays set free in the radioactive decay reactions and carry off the decay heat to the outside.

Known shielding containers for the most part consist of a metallic base container with the necessary wall thickness for shielding the gamma rays, customarily of steel or a combination of lead and steel and an outer shell of neutron shielding material, for the most part polyethylene pellets filled in synthetic resin. Normally there are welded or soldered on the metallic base flanges or fins which penetrate the resin layer. They are necessary to increase the metallic surface of containers which are laid out for a high heat conductivity and for carrying off the heat through the in general poor heat conducting neutron shielding layer.

The disadvantage of this construction is that slight collisions of the containers, as can occur even in routine operation can lead to damage to the heat conducting fins and the resin layer and accordingly make necessary an expensive repair of the entire container.

Furthermore, it is scarcely possible to carry out a cleansing or, in the case of contamination, a decontamination, of the outer surface of the container built of fins or flanges. This must therefore be protected through applying a protective shell in the handling operations in which there is the danger of a containination of the surface, thus for example in the loading and unloading.

A further disadvantage of this known shielding container is that the number of heat conducting fins and the thickness of the neutron shield must be designed for the maximum predicted conditions in transportation. However, in a great part of transportation containers and storage containers spent fuel elements are included which are already so far decayed in the fuel element storage tanks of the nuclear power plant that in the cases both the neutron shielding and the fin surfaces of the container are oversized.

Therefore it was the problem of the present invention to provide a shielding container for the transportation and/or storage of spent fuel elements with a neutron shield on the outer container surface in which it is possible to make a repair on the neutron shield without repairing the entire container, in which manipulative operations are possible without danger of contamination as well as without applying a protective shell and which in a given case can be adjusted to the changing requirements of the individual case with reference to irradiation intensity.

SUMMARY OF THE INVENTION

This problem has been solved according to the invention by making the neutron shield of a series of hollow pieces made of a good heat conducting material and filled with neutron shielding material, the hollow pieces being provided with heat conducting fins and joined together are fastened to the surface of the container. This neutron shield can be easily removed from the shielding container by way of special fastening means and stretching devices and again be installed. The number and thickness of the hollow pieces is adjusted to the particular requirements.

BRIEF DESCRIPTION OF THE DRAWINGS

The drawings schematically illustrate the construction of a removable neutron shield according to the invention.

The shielding container can comprise, consist essentially of or consist of the elements set forth.

DESCRIPTION OF THE PREFERRED EMBODIMENTS

Figure 1:
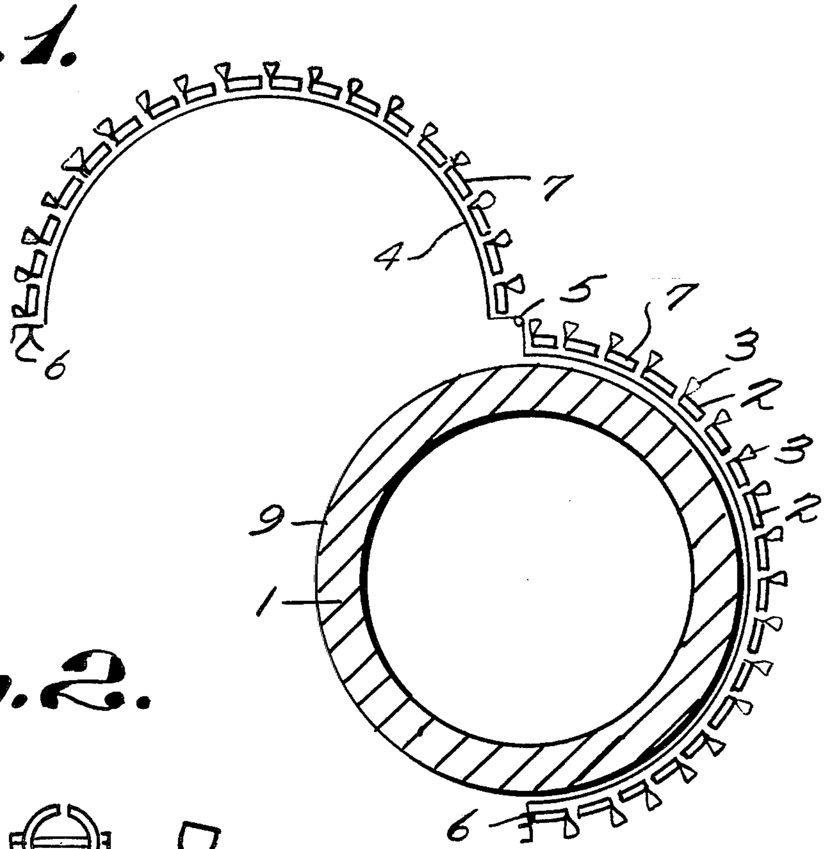
FIG. 1 shows the shielding container with partially opened neutron shielding jacket in cross-section.

Referring more specifically to FIG. 1 of the drawings the hollow pieces 2 formed with the neutron absorbing jacket 7 and having the heat conducting fins or flanges 3 arranged thereon are fastened to elastic steel belts 4. The steel belts 4 are so preshaped that they have a somewhat wider curve than the curve of the base container 1. The elastic steel belts 4 are connected on one side, for example with a hinge 5 and can be held in tension on the opposite side in the closed condition with a tension bolt 6 around the surface 9 of the base container 1. The shielding jacket 7 can also be divided into several parts which then in turn are joined with a hinge or other element.

The hollow piece 2 can be secured to the elastic steel belts 4 in any manner, especially with rivets, screws or welded joints.

Figure 2:
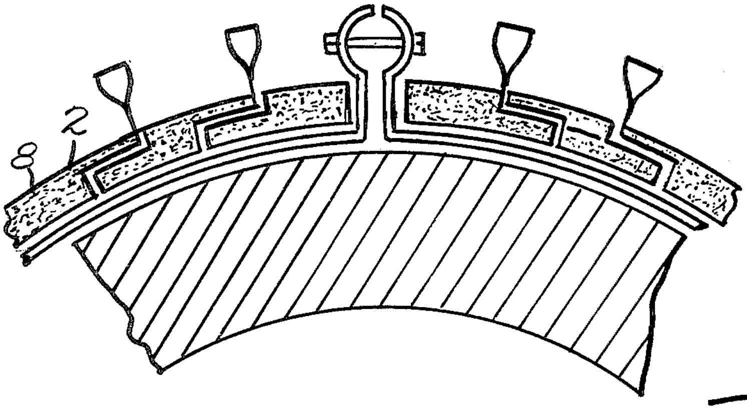
FIG. 2 illustrates a particularly preferred form of the hollow piece 2 filled with neutron shielding material.

FIG. 2 shows a particularly advantageous form of the hollow pieces 2 filled with a neutron absorbing material 8 in which there is prevented a direct passage of neutron radiation on the position of the hollow articles 2 through the partial overlapping. These are secured to steel belt 4 fastened hollow section 2 through the tensioning device 6.

Figure 4:
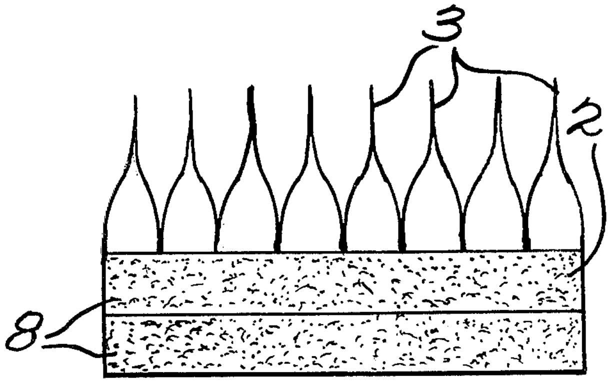
FIG. 4 is a view similar to FIG. 3 but in longitudinal section.
Figure 3:
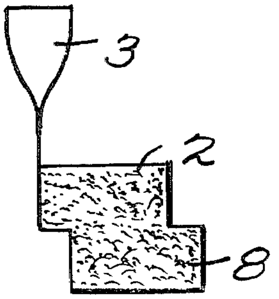
FIG. 3 shows schematically in cross-section hollow piece with a preferred shaped heat-conducting fins.

In FIGS. 3 and 4 there is presented schematically in cross-section an individual hollow piece 2 having preferred shaped heat conducting fins 3. The hollow space of the hollow piece 2 is filled up with a neutron shielding material.

In place of the elastic steel belts 4 there can also be used articulated belts or chains, likewise this belt can be eliminated entirely if the individual hollow sections are joined together directly with elastic or hinge type joints.

Likewise the elastic steel belts 4 need not be installed below hollow pieces 2 but can also be installed above the hollow pieces 2. In this form of the invention there can be eliminated a durable securing of the hollow piece 2 to the elastic steel belts 4.

In the event of damage to the heat conducting fins and/or the neutron shield there is not needed an expensive repair of the entire container. This must be undertaken in a "hot work place", i.e., in a work place established and left closed for the circuit with radioactive materials, since an already used container is necessarily a carrier of a residual radioactivity. A damaged neutron shield or heat conducting fin according to the invention usually can be repaired on the spot by changing the damaged elements. With greater damages the entire neutron shielding jacket can be changed and the container is again immediately employable.

For loading and unloading the container the neutron shielding jacket can be removed, the application of a special protection shell therefore is not necessary.

Several removeable neutron shielding jackets with different lay outs in regard to carrying off the heat and neutron shielding can be prepared for a transportation and/or storage container. Through this there can be employed the suitable jacket for the insertion of a container for transportation and or use. This reduces in transportation spent fuel elements with long decay time the transportation weight and the outer dimension of the container.

What is claimed is:

1. A shielding container for the transportation and/or storage of spent fuel elements including neutron shielding jacket means for the outer surface of the container, said jacket means comprising a series of hollow members constructed from a good heat-conducting material, each of said hollow members being filled with a neutron shielding material, means for mounting said hollow members on the outer surface of the container so as to cover the surface of the container, each of said hollow members being provided with heat-conducting fin means, said mounting means being a steel belt means and said hollow members each being secured to said steel belt means, said steel belt means having at least one hinge means and at least one tensioning means to facilitate attachment of said steel belt means to the periphery and curve of said container.

2. A shielding container for the transportation and/or storage of spent fuel elements including neutron shielding jacket means for the outer surface of the container, said jacket means comprising a series of hollow members constructed from good heat-conducting material, each of said hollow members being filled with a neutron shielding material, means for mounting said hollow members on the outer surface of the container so as to cover the surface of the container, each of said hollow members being provided with heat-conducting fin means, and each of said hollow members being constructed with portions which overlap with an adjacent hollow member when said hollow members are assembled on said mounting means, said mounting means being a steel belt means and said hollow members each being attached to said steel belt means, said steel belt means having at least one hinge means and at least one tensioning means to facilitate attachment of said steel belt means to the periphery and curve of said container.

3. A shielding container for the transportation and/or storage of spent fuel elements including neutron shielding jacket means for the outer surface of the container, said jacket means comprising a series of hollow members constructed from good heat-conducting material, each of said hollow members being filled with a neutron shielding material, means for mounting said hollow members on the outer surface of the container so as to cover the surface of the container, each of said hollow members being provided with heat-conducting fin means, each of said hollow members being constructed with portions which overlap with an adjacent hollow member when said hollow members are assembled on said mounting means, said heat-conducting fin means being molded on said hollow members, said mounting means being a steel belt means and said hollow members each being attached to said steel belt means which is provided with at least one hinge means and at least one tensioning means to facilitate attachment of said steel belt means to the periphery and curve of said container.

* * * * *